United States Patent [19]

Redlich et al.

[11] Patent Number: 5,068,607

[45] Date of Patent: Nov. 26, 1991

[54] ELECTRICAL LINEAR POSITION TRANSDUCER WITH SILICON STEEL FOIL SHIELD SURROUNDING TRANSDUCER COIL

[75] Inventors: Robert W. Redlich, Athens, Ohio; Douglas Bliss, Leominster, Mass.

[73] Assignee: Data Instruments, Inc., Acton, Mass.

[21] Appl. No.: 542,152

[22] Filed: Jun. 22, 1990

[51] Int. Cl.⁵ .................. G01B 7/14; G08C 19/08
[52] U.S. Cl. ........................ 324/207.16; 324/207.24; 336/130; 340/870.31
[58] Field of Search ............ 324/207.15, 207.16, 324/207.17, 207.18, 207.19, 207.24; 340/870.31–870.36; 336/45, 130, 136

[56] References Cited

U.S. PATENT DOCUMENTS 4,667,158  5/1987  Redlich .................. 324/207.19

Primary Examiner—Gerard R. Strecker
Attorney, Agent, or Firm—Pandiscio & Pandiscio

[57] ABSTRACT

A new linear position transducer is disclosed which is substantially identical to the transducer described and illustrated in U.S. Pat. No. 4,667,158, except that the tubular layer contained between the coil and the outer shield comprises a silicon steel foil wrapped around the coil which has the effect of reducing the reluctance of this space to a low value. An electrical insulator is applied to one side of the silicon steel foil to prevent the creation of a current path between the coil and the outer shield of the transducer.

26 Claims, 1 Drawing Sheet

ELECTRICAL LINEAR POSITION TRANSDUCER WITH SILICON STEEL FOIL SHIELD SURROUNDING TRANSDUCER COIL

FIELD OF THE INVENTION

This invention relates to transducers in general, and more particularly to transducers for measuring straight line motion.

BACKGROUND OF THE INVENTION

U.S. Pat. No. 4,667,158 issued May 19, 1987 to Robert W. Redlich for "Linear Position Transducer And Signal Processor" discloses a transducer for measuring straight line motion. Several different embodiments of the transducer are disclosed in that patent, the specification and drawings of which are incorporated herein by reference.

In general, and referring now to FIGS. 1 and 2, the transducer disclosed in U.S. Pat. No. 4,667,158 comprises a hollow tube-like bobbin 1 (formed out of an electrically insulating material such as plastic); a helical coil 2 (formed out of a good electrical conductor such as copper) wound around the outer surface of bobbin 1; a cylindrical rod or tube 3 (formed out of a good electrical conductor having low magnetic permeability such as copper or aluminum), with the rod being axially movable within bobbin 1; an attachment rod 3A connecting rod 3 with the object whose motion is to be measured; an outer shield tube 4 (formed out of a material having both high electrical conductivity and high magnetic permeability such as soft iron or low carbon steel), the shield tube 4 surrounding the remainder of the transducer and confining magnetic flux generated by current flowing through coil 2 to the interior of the transducer and shielding coil 2 from stray fields; and a tubular layer 13 (formed out of a material having high magnetic permeability and low electrical conductivity such as a ferrite powder distributed within a hardened bonding agent), with the tubular layer 13 being disposed between coil 2 and shield 4 and having the effect of reducing the reluctance of this space to a low value.

When attachment rod 3A is connected to an object whose motion is to be measured, and the coil is suitably energized, changes in the position of the object whose motion is to be measured will result in changes in the position of the rod 3 relative to coil 2; this movement of rod 3 relative to coil 2 will, in turn, cause changes in the inductance of coil 2 by means of skin effect, which changes in inductance can be measured to indicate the linear motion of the object.

In U.S. Pat. No. 4,667,158, the tubular layer 13 disposed between coil 2 and outer shield tube 4 is described (at column 6, lines 8-12) as being a ferrite material having a high magnetic permeability but a low electrical conductivity. In addition, it is stated (at column 6, lines 15-17) that "... ferrite 13 is preferably a ferrite powder distributed within a hardened bonding agent."

In practice, it has been found that the necessary ferrite powder can be difficult to obtain, particularly in the form desired. In addition, it has been found that fabricating a suitable tubular layer 13 out of the ferrite powder can be more expensive, time-consuming and complex than desired.

For example, in one process currently used to fabricate a transducer of the sort described in U.S. Pat. No. 4,667,158 and employing the ferrite powder tubular layer 13, it is necessary to (a) first prepare a proper mixture of ferrite powder and bonding agent, (b) then fill shield 4 with this mixture, being careful to see that the mixture is evenly distributed within the shield, (c) next spin the loaded shield on a centrifuge under a heat lamp, (d) thereafter allow the loaded shield to cure overnight, (e) next drill out the loaded shield on a lathe to make room for the interior components of the transducer, and (f) then assemble the interior components of the transducer within the loaded shield.

In practice, it has also been found that forming the tubular layer 13 out of ferrite powder as described above can result in performance variations as the temperature of the transducer varies, and can reduce the accuracy of the transducer if not evenly mixed and distributed.

OBJECTS OF THE INVENTION

As a result, the principal object of the present invention is to provide a suitable alternative to the ferrite powder composition used to form the tubular layer 13 described in U.S. Pat. No. 4,667,158.

Another object of the present invention is to provide a new linear position transducer which is relatively fast, simple and inexpensive to manufacture, and which is reliable in operation.

Still another object of the present invention is to provide a new linear position transducer which has improved temperature performance and which offers an improved signal to noise ratio.

SUMMARY OF THE INVENTION

These and other objects of the invention are addressed by a new linear position transducer which is substantially identical to the transducer described and illustrated in U.S. Pat. No. 4,667,158, except that the tubular layer 13 contained between coil 2 and outer shield 4 comprises a silicon steel foil surrounding the coil.

BRIEF DESCRIPTION OF THE DRAWINGS

These and other objects and features of the present invention will be further disclosed or rendered obvious by the following detailed description of the preferred embodiment of the invention, which is to be considered together with the accompanying drawings wherein.

DETAILED DESCRIPTION OF THE PREFERRED EMBODIMENT

Figure 1:
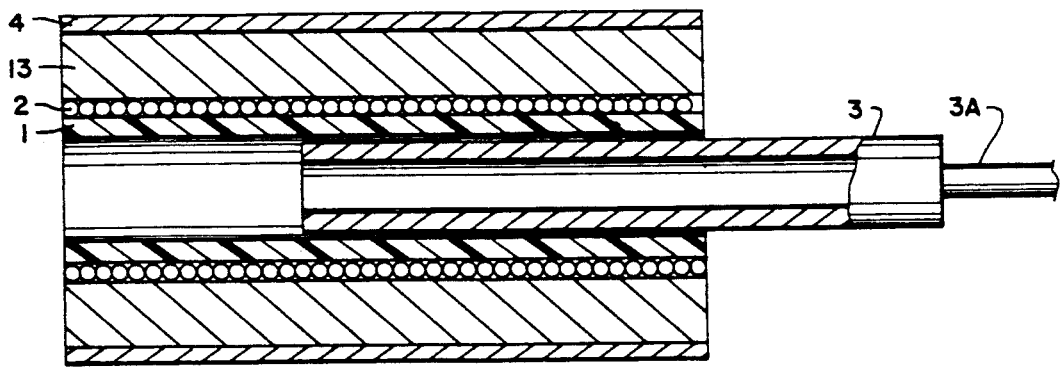
FIG. 1 is an axial, cross-sectional view of a prior art linear position transducer of the sort described and illustrated in U.S. Pat. No. 4,667,158 and employing a ferrite powder composition to form the tubular layer 13.
Figure 2:
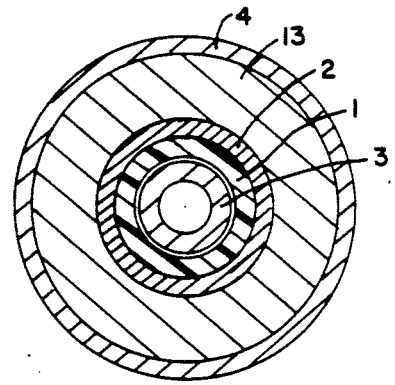
FIG. 2 is a radial, cross-sectional view of the prior art linear position transducer shown in FIG. 1.
Figure 3:
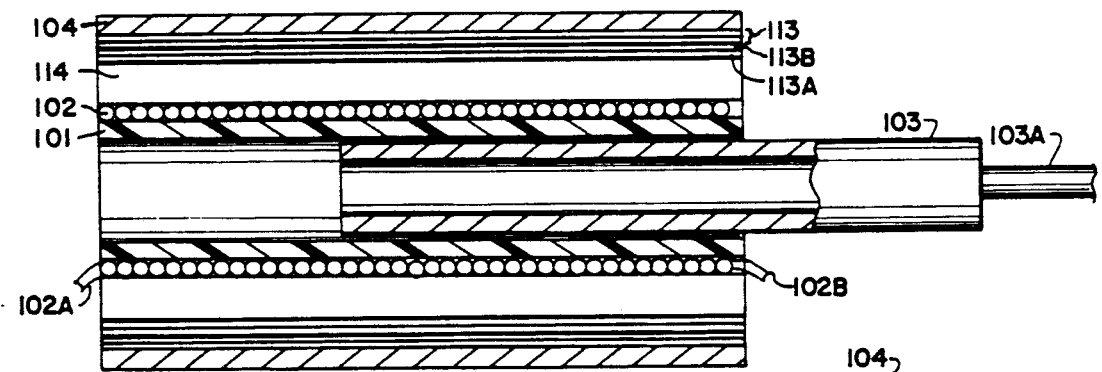
FIG. 3 is an axial, cross-sectional view of an improved linear position transducer formed in accordance with the present invention.
Figure 4:
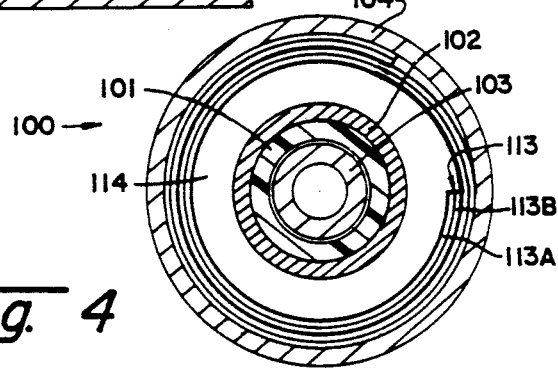
FIG. 4 is a radial, cross-sectional view of the new linear position transducer shown in FIG. 3.

Looking next at FIGS. 3 and 4, there is shown an improved linear position transducer 100 formed in accordance with the present invention.

Transducer 100 is substantially identical to the linear position transducer disclosed in U.S. Pat. No. 4,667,158, except as will be hereinafter described in detail. More specifically, transducer 100 comprises a hollow tube-like bobbin 101 (formed out of an electrically insulating material such as plastic); a helical coil 102 (formed out of a good electrical conductor such as copper) wound around the outer surface of bobbin 101 and having its ends 102A, 102B connected to suitable terminal pins (not shown); a cylindrical rod or tube 103 (formed out of a good electrical conductor having low magnetic permeability such as copper or aluminum), with the rod being axially movable within bobbin 101; an attachment rod 103A connecting rod 103 with the object whose motion is to be measured; an outer shield tube 104 (formed out of a material having both high electrical conductivity and high magnetic permeability such as soft iron or low carbon steel), the shield tube 104 surrounding the remainder of the transducer and confining magnetic flux generated by current flowing through coil 102 to the interior of the transducer and shielding coil 102 from stray fields; and an element 113 (formed out of a material having, overall, high magnetic permeability and low electrical conductivity), with the element 113 being disposed between coil 102 and shield 104 and having the effect of reducing the reluctance of this space to a low value without providing a current path between coil 102 and shield 104.

It is to be appreciated that bobbin 101 of transducer 100 is substantially the same as bobbin 1 of the transducer disclosed in U.S. Pat. No. 4,667,158; helical coil 102 of transducer 100 is substantially the same as helical coil 2 of the transducer disclosed in U.S. Pat. No. 4,667,158; cylindrical rod 103 of transducer 100 is substantially the same as cylindrical rod 3 of the transducer disclosed in U.S. Pat. No. 4,667,158; attachment rod 103A of transducer 100 is substantially the same as attachment rod 3A of the transducer disclosed in U.S. Pat. No. 4,667,158; and outer shield tube 104 of transducer 100 is substantially the same as outer shield tube 4 of the transducer disclosed in U.S. Pat. No. 4,667,158.

It is also to be appreciated that element 113 of transducer 100 is analogous to tubular layer 13 of the transducer disclosed in U.S. Pat. No. 4,667,158, although it differs substantially in construction, as will hereinafter be described in detail. To this end, element 113 is formed so as to have, overall, a high magnetic permeability and as low an electrical conductivity as possible, so as to have the effect of reducing the reluctance of the space between coil 102 and shield 104 without providing a current path between coil 102 and shield 104.

Element 113 comprises one or more sheets of silicon steel foil 113A which are coated with an electrical insulator 113B on at least one side thereof. Foil 113A is wound around itself, with insulator 113B to the outside, is slipped into the space between coil 102 and outer shield tube 104, and is then allowed to unroll until it comes into contact with outer shield tube 104. As this occurs, the insulator 113B will contact outer shield tube 104 and prevent foil 113A from coming into direct electrical contact with shield tube 104.

Preferably foil 113A comprises grain oriented, cold rolled 3% silicon steel having a thickness of about 0.001 of an inch. Such silicon steel foil is available from a wide variety of sources, e.g. it might comprise silicon steel foil sold by Allegheny Ludlum under the tradename Silectron. Preferably foil 113A is such that there are at least 6 turns of the foil disposed between coil 102 and outer shield tube 104. In practice, it has been found that using 3 sheets of silicon steel foil, which when rolled produce a total of 9 turns, works well. Of course, depending on the transducer performance characteristics desired, it is possible to use less turns of the silicon steel foil. In practice, it has been found that the fewer the number of turns of silicon steel foil used, the more nonlinear the transducer's performance characteristics. In addition, using fewer turns of the silicon steel foil appears to worsen the temperature performance of the transducer.

It is important that adjacent layers of the silicon steel foil 113A be insulated from one another by layers of insulator 113B so that there is no closed path within element 113 for eddy currents to form. The number of turns of the silicon steel foil 113A is selected so that the cross-sectional area of the silicon steel foil 113A is large enough to insure that the silicon steel material does not go into saturation as a result of the magnetic field in the transducer. At the same time, each turn of the silicon steel foil 113A is kept very thin to minimize potential core losses.

Preferably insulator 113B comprises a material which will act as both an insulator (to prevent the outer layer of silicon steel foil 113A from coming into direct electrical contact with shield tube 104, and to prevent adjacent layers of the silicon steel foil 113A from coming into contact with one another) and as an adhesive to hold the silicon steel foil 113A in position within the transducer. It is important that the insulator 113B be relatively temperature stable and non-hygroscopic, as well as insulating. A satisfactory insulating/adhesive material is available from a wide variety of sources, e.g. it might comprise the insulating/adhesive material sold by W. J. Ruscoe Company of Akron, Ohio under the tradename PLIOBOND. The insulating/adhesive material is applied to the outer surface of silicon steel foil 113A to a sufficient thickness that it will form a uniform, effective insulating/adhesive layer, e.g. it might be spread to a thickness of approximately 0.002 of an inch when wet. The insulating/adhesive material may be sprayed on to the outer surface of silicon steel foil 113A or it may be applied in other ways well known in the art. It is important that the insulating/adhesive material be sufficiently viscous that it will not run after it has been applied to the outer surface of silicon steel foil 113A. The insulating/adhesive material may be heat set if necessary to bind the silicon steel foil 113A securely within the transducer.

It is also to be appreciated that the insulating/adhesive material may comprise a sheet of insulating/adhesive material attached to the outer surface of silicon steel foil 113A.

It is important that the silicon steel foil 113A be held securely in position within the transducer. In the event that insulator 113B comprises a material which functions solely as an insulator and does not also function as an adhesive, an additional adhesive material may be added on top of the insulating material to effect proper bonding of the silicon steel layers to one another and to shield tube 104.

Alternatively, insulator 113B could comprise an electrically insulative tape such as Kapton (R) tape, having a thickness of about 0.001 of an inch. Of course, as noted above, in the situation where insulator 113B comprises electrically insulative tape, an adhesive material must be added to the outside surface of the tape to effect proper bonding of the silicon steel layers to one another and to shield tube 104.

Foil 113A and electrical insulator 113B together form the element 113 which provides a layer which has high magnetic permeability, whereby the reluctance of the space between coil 102 and shield tube 104 will be reduced to a low value. At the same time, electrical insulator 113B will prevent coil 102 from making direct electrical contact with shield tube 104, so that no current path will be provided between coil 102 and shield 104.

When forming the transducer in accordance with the foregoing construction, it is important to minimize any stress in the silicon steel foil 113A since the magnetic permeability of the foil will vary with the amount of applied stress. It is also important that the layers of silicon steel foil 113A be uniformly positioned within the transducer, with no wrinkles in the foil, etc., since the linearity of the transducer is dependent on the uniformity of the flux field within the transducer, which is in turn dependent on the uniformity of the silicon steel layers.

It is to be appreciated that, after the layer 113 is set in place around coil 102, a bonding agent 114 may be used to fill the space between coil 102 and layer 113. Bonding agent 114 must be formed out of a material which is temperature stable and non-hygroscopic, as well as insulating. Bonding agent 114 may comprise the same insulating/adhesive material used to form insulator 113B (except that, in this case, it would be formed somewhat more viscous than the material used for insulator 113B, to permit the bonding agent to flow into the transducer shell), or it might comprise a different bonding agent, such as that well known in the art. In addition, the two ends of the transducer are capped in ways well known in the art (not shown) to prevent the creation of any direct current paths between the transducer elements previously described, while still providing electrical access to the ends 102A, 102B of coil 102.

As a result of the foregoing construction, when attachment rod 103A is connected to an object whose motion is to be measured, and coil 102 is suitable energized, changes in the position of the object whose motion is to be measured will result in changes in the position of the rod 3 relative to the coil; this movement of rod 3 relative to coil 2 will, in turn, cause changes in the inductance of coil 2 by means of skin effect, which changes in inductance can be measured to indicate the linear motion of the object. In this respect, it is to be appreciated that appropriate coil energizing and signal processing apparatus such as that described and illustrated in U.S. Pat. No. 4,667,158 may be utilized with the new linear position transducer which constitutes the present invention.

In practice, it has been found that by forming element 113 as described herein, an improved linear position transducer can be formed which has superior temperature performance and an improved signal to noise ratio.

Advantages Of The Invention

Numerous advantages are obtained by using the present invention.

For one thing, the present invention provides a suitable alternative to the ferrite powder composition used to form the tubular layer 13 described in U.S. Pat. No. 4,667,158.

For another thing, a new linear position transducer is disclosed which is relatively fast, simple and inexpensive to manufacture, and which is reliable in operation.

Furthermore, a new linear position transducer is disclosed which has improved temperature performance and which offers an improved signal to noise ratio.

What is claimed is:

1. A linear position transducer for use in an electrical linear position measurement circuit comprising:
   (a) a tube of electrically insulating material having a length at least substantially four times its outside diameter;
   (b) a helical, electrically conductive coil wound around said tube and being at least substantially four of said outside diameters long, the ends of said coil being adapted for connection to said circuit so as to be energizable by said circuit;
   (c) an elongated core of electrically conducting, non-ferromagnetic material having a first position adjacent one of its ends matingly received within, and slidable in axial reciprocation within, said tube, and a second portion adjacent its other end extending axially outwardly from said tube, said other end adapted to engage a workpiece;
   (d) at least one layer of a selected material having a high magnetic permeability surrounding said coil and being at least substantially four of said diameters long; and,
   (e) an electrically insulating material covering at least the outer side of said at least one layer of said selected material;
   whereby axial movement of said core in said tube in response to changes in the linear position of said workpiece creates changes in the inductance of said coil which may be detected by said circuit.

2. A linear position transducer according to claim 1 wherein a tubular, electrically conductive shield surrounds said at least one layer of said selected material, and further wherein said electrically insulating material extends between said shield and said at least one layer of said selected material so as to prevent current flow between said shield and said at least one layer of said selected material.

3. A linear position transducer according to claim 2 wherein said at least one layer of said selected material comprises an inner surface disposed towards said coil and an outer surface disposed towards said shield, and further wherein said electrically insulating material is attached to said outer surface of said at least one layer of said selected material.

4. A linear position transducer according to claim 3 wherein said electrically insulating material is also an adhesive binding said at least one layer of said selected material to said shield.

5. A linear position transducer according to claim 4 wherein said electrically insulating material is approximately 0.002 of an inch thick.

6. A linear position transducer according to claim 3 wherein an adhesive is disposed between said electrically insulating material and said shield to bind said at least one layer of said selected material to said shield.

7. A linear position transducer according to claim 6 wherein said electrically insulating material comprises an insulative tape and further wherein said adhesive is disposed between said insulative tape and said shield.

8. A linear position transducer according to claim 7 wherein said insulative tape has a thickness of approximately 0.001 of an inch.

9. A linear position transducer according to claim 1 comprising at least 6 layers of said selected material, with each layer comprising grain oriented, cold rolled 3% silicon steel foil having a thickness of about 0.001 of an inch.

10. A linear position transducer according to claim 9 wherein a tubular, electrically conductive shield surrounds the outer layer of said at least 6 layers, and further wherein each layer of said at least 6 layers comprises a layer of silicon steel foil having an inner surface disposed towards said coil and an outer surface disposed towards said shield, and an electrically insulating material is disposed on the outer surface of each silicon steel foil layer so as to (a) prevent current flow between said shield and the outer layer of said silicon steel foil and (b) prevent radial current flow between adjacent silicon steel foil layers.

11. A linear position transducer according to claim 10 wherein said electrically insulating material is also an adhesive for binding said at least 6 layers to one another, and also for bonding the outer layer of said at least 6 layers to said shield.

12. A linear position transducer according to claim 11 wherein said electrically insulating material between adjacent layers and between said outer layer and said shield is approximately 0.002 of an inch thick.

13. A linear position transducer according to claim 10 wherein an adhesive is disposed on said electrically insulating material on the outer surface of each layer of said at least 6 layers so as (a) to bind said at least 6 layers to one another via said electrically insulating material, and (b) bind the outer layer of said at least 6 layers to said shield.

14. A linear position transducer according to claim 13 wherein said electrically insulating material comprises an insulative tape disposed on the outer surface of each silicon steel foil layer.

15. A linear position transducer according to claim 14 wherein said insulative tape has a thickness of approximately 0.001 of an inch.

16. A linear position transducer according to claim 1 wherein said at least one layer comprises 9 layers, and further wherein each of said layers has a thickness of about 0.001 of an inch and comprises grain oriented, cold rolled 3% silicon steel foil.

17. A linear position transducer according to claim 1 wherein a bonding agent is disposed between said coil and said at least one layer.

18. A linear position transducer according to claim 1 wherein said selected material is in sheet form but is rolled upon itself into a tubular shape, and further wherein said electrically insulating material is also in sheet form and extends between adjacent turns of said sheet of said selected material.

19. A linear position transducer for use in an electrical linear position measurement circuit comprising:
  (a) an electrically insulating tube-like bobbin having an outer surface;
  (b) an electrically conducting helical coil having two ends wound around the outer surface of said bobbin, the ends of said coil being adapted for connection to said electrical circuit;
  (c) a elongate, cylindrical member of a selected electrically conducting, non-ferromagnetic material matingly received within and slidable axially relative to said bobbin;
  (d) means for connecting said elongate, cylindrical member to a workpiece;
  (e) an outer shield tube of a selected material having high electrical conductivity and high magnetic permeability, said outer shield tube surrounding said coil so as to define a substantially cylindrical volume therebetween; and,
  (f) an element having a high magnetic permeability and a low electrical conductivity surrounding said coil within said cylindrical volume as to reduce the reluctance of the space between said coil and said shield without providing a current path therebetween; said element comprising at least one sheet of steel foil having a selected electrically insulating material covering one of its sides, said at least one foil sheet being wound spirally around itself with said side covered with said electrically insulating material facing outwardly.

20. The transducer of claim 19 wherein the bobbin is made of plastic.

21. The transducer of claim 19 wherein the coil is made of copper wire.

22. The transducer of claim 19 wherein the elongate cylindrical member is made of a material selected from the group consisting of copper and aluminum.

23. The transducer of claim 19 wherein the outer shield tube is made of a material selected from the group consisting of soft iron and low carbon steel.

24. The transducer of claim 19 wherein the steel foil comprises grain oriented, cold rolled, 3% silicon steel.

25. The transducer of claim 24 wherein said silicon steel has a thickness of approximately 0.001 inches.

26. The transducer of claim 19 wherein the outer surface of said element bears against the inner surface of said outer shield tube.

* * * * *

UNITED STATES PATENT AND TRADEMARK OFFICE
CERTIFICATE OF CORRECTION

PATENT NO.  : 5,068,607

DATED       : November 26, 1991

INVENTOR(S) : Robert W. Redlich, et al.

It is certified that error appears in the above-identified patent and that said Letters Patent is hereby corrected as shown below:

Claim 1, column 6, line 12, the word "position" should be -- portion --.

Signed and Sealed this

Tenth Day of August, 1993

Attest:

MICHAEL K. KIRK

Attesting Officer

Acting Commissioner of Patents and Trademarks